United States Patent
Bale et al.

(10) Patent No.: US 7,184,864 B2
(45) Date of Patent: Feb. 27, 2007

(54) VEHICLE SYSTEM CONTROL UNIT WITH AUXILIARY CONTROL CAPABILITIES

(75) Inventors: Paul Bale, Worcestershire (GB); Dudley Harrison, Birmingham (GB)

(73) Assignee: Haldex Brake Products Ltd. (GB)

( * ) Notice: Subject to any disclaimer, the term of this patent is extended or adjusted under 35 U.S.C. 154(b) by 157 days.

(21) Appl. No.: 10/827,510

(22) Filed: Apr. 19, 2004

(65) Prior Publication Data
US 2005/0234603 A1 Oct. 20, 2005

(51) Int. Cl.
*G05D 1/00* (2006.01)
*G05D 3/00* (2006.01)

(52) U.S. Cl. .............. 701/2; 701/30; 701/36; 340/439

(58) Field of Classification Search .......... 701/1, 701/2, 29–35, 36, 39, 63, 97; 340/425.5, 340/439
See application file for complete search history.

(56) References Cited

U.S. PATENT DOCUMENTS

| | | | |
|---|---|---|---|
| 6,139,118 A | 10/2000 | Hurst et al. | 303/7 |
| 6,234,585 B1 | 5/2001 | Harris et al. | 303/20 |
| 6,243,627 B1* | 6/2001 | Ozeki | 701/29 |
| 6,447,075 B2 | 9/2002 | Ross et al. | 303/20 |
| 6,540,309 B1 | 4/2003 | Jordan et al. | 303/122.07 |
| 6,553,290 B1* | 4/2003 | Pillar | 701/33 |
| 2001/0019980 A1* | 9/2001 | Kanehisa | 475/5 |
| 2001/0020281 A1* | 9/2001 | Retter et al. | 714/4 |
| 2002/0194551 A1* | 12/2002 | Mueller et al. | 714/48 |
| 2004/0002794 A1* | 1/2004 | Pillar et al. | 701/1 |

FOREIGN PATENT DOCUMENTS

| | | |
|---|---|---|
| EP | 0 924 125 | 6/1999 |
| EP | 0 999 117 | 5/2000 |
| EP | 1 231 121 | 8/2002 |

\* cited by examiner

*Primary Examiner*—Gertrude A-Jeanglaude
(74) *Attorney, Agent, or Firm*—St. Onge Steward Johnston & Reens LLC

(57) ABSTRACT

A control system for a vehicle includes a first electronically controlled vehicle system, a second electronically controlled vehicle system, and a control unit. The control unit controls operation of at least one component of the first electronically controlled vehicle system while the vehicle is moving and preferably also while the vehicle is stationary, and controls operation of at least one component of the second electronically controlled vehicle system only while the vehicle is stationary.

29 Claims, 1 Drawing Sheet

VEHICLE SYSTEM CONTROL UNIT WITH AUXILIARY CONTROL CAPABILITIES

FIELD OF THE INVENTION

The present invention relates generally to electronically controlled vehicle systems, such as brake systems, which are intended for use with wheeled vehicles, and more particularly to a control unit for controlling such systems which is additionally capable of controlling auxiliary vehicle systems.

BACKGROUND OF THE INVENTION

Traditional vehicle dynamics control systems and ride control systems, such as brake systems and suspension systems, for motor vehicles include hydraulically or pneumatically actuated components associated with two or more wheels of the vehicle. In the case of conventional brake systems, for example, when actuated, the brakes exert a force on a disk or drum which spins in conjunction with the wheel of the vehicle in order to create frictional forces which resist rotation of the wheel. Traditionally, control signals have been transmitted to each of the vehicle dynamics control system's and/or ride control system's components mechanically, or by a hydraulic or pneumatic control circuit. However, it has more recently been proposed to employ a centralized electronic control unit to generate electronic control signals and to use such electronic control signals to control actuation of system components, such as brake actuators. This type of electronic control scheme has become even more prevalent in view of modern vehicle dynamics control systems and ride control systems which now often include not only conventional hydraulic or pneumatic actuator functionality, but also supplemental electronic functions such as antilock protection (ABS) and/or electronic braking force distribution (EBV) between the front and rear axles.

Such electronic control schemes are generally controlled by one or more electronic control units (ECUs), which have a program running thereon which receives various inputs and generates electronic output signals, such as control signals, which are supplied to each of the vehicle system's components. As a more specific example, in electronically controlled braking systems for vehicles, commonly referred to as "brake-by-wire" (BBW) systems, control of the vehicle brakes is achieved by the use of electronic control signals generated at a brake pedal in response to a driver's braking demand and an electronic controller which is adapted to control the supply of fluid under pressure, or more recently electronic power, from a power source to the brakes in accordance with the electronic signals corresponding to the driver's demand.

In modern vehicles, there are typically provided a plurality of electronically controlled vehicle dynamics control systems and ride control systems, or at least one electronically controlled vehicle dynamics control system or ride control system and at least one additional electronically controlled vehicle system. For example, a vehicle may include an electronically controlled electronic brake system (EBS), an antilock brake system (ABS), a suspension system, a traction control system, an anti-slip regulation (ASR) system, a steering system, a stability control system, an electronic stability program (ESP), an adaptive cruise control (ACC) system, a diagnostics system, a trailer interface system, a transmission system, an air management control system, a continuous brake retarder system, an engine control system, etc. It is typical for each of these systems to have separate electronic control units, which may or may not communicate with one another. It would, however, be more desirable and economical for several vehicle systems to be controlled by a single control unit.

A problem exists with this solution, however, in that at certain times, it may be undesirable for the single control unit to control multiple systems, particularly if the control unit is primarily responsible for controlling a critical system. For example, while it may be desirable for the control unit of an electronic braking system to also control one or more auxiliary vehicle systems, such may, at times, interfere with the control unit's primary responsibility of controlling the brake system. As such, at those times when such an interference may occur, it would be desirable for the control unit of the braking system to cease controlling such auxiliary systems.

What is desired, therefore, is a control system for controlling a primary electronically controlled vehicle system which also controls at least one additional auxiliary vehicle system, which controls the auxiliary vehicle system only at certain times when such does not interfere with control of the primary vehicle system, and which gives precedence to controlling the primary vehicle system over the auxiliary vehicle system.

SUMMARY OF THE INVENTION

Accordingly, it is an object of the present invention to provide a control system which controls a primary electronically controlled vehicle system and which also controls at least one additional auxiliary vehicle system.

Another object of the present invention is to provide a control system having the above characteristics and which controls the auxiliary vehicle system only at certain times when such does not interfere with control of the primary vehicle system.

A further object of the present invention is to provide a control system having the above characteristics and which gives precedence to controlling the primary vehicle system over the auxiliary vehicle system.

These and other objects of the present invention are achieved in one embodiment by provision of a control system for a vehicle which includes a first electronically controlled vehicle system, a second electronically controlled vehicle system, and a control unit. The control unit controls operation of at least one component of the first electronically controlled vehicle system while the vehicle is moving, and controls operation of at least one component of the second electronically controlled vehicle system only while the vehicle is stationary.

In some embodiments, the control unit controls operation of the at least one component of the first electronically controlled vehicle system both while the vehicle is moving and while the vehicle is stationary. In some embodiments, the first electronically controlled vehicle system comprises an electronic brake system. In some embodiments, the control unit controls operation of the at least one component of the first electronically controlled vehicle system and of the at least one component of the second electronically controlled vehicle system in response to sensor input. In some embodiments, the control unit controls operation of the at least one component of the first electronically controlled vehicle system and of the at least one component of the second electronically controlled vehicle system in response to input of a vehicle operator.

In certain embodiments, the control unit comprises a main control unit having a memory, and the system further comprises at least one auxiliary control unit in communication with the main control unit via a communications link. The main control unit controls operation of the at least one auxiliary control unit, control of the at least one auxiliary control unit being based at least in part upon parameters indicative of a configuration of the at least one auxiliary control unit stored in the memory of the main control unit. The system further comprises a programming unit connectable to the main control unit, the programming unit operable by a user to modify the parameters stored in the memory of the main control unit.

In accordance with another embodiment of the present invention, a control system for a vehicle includes a first electronically controlled vehicle system, a second electronically controlled vehicle system, and a control unit. The control unit is adapted to control at least one component of the first electronically controlled vehicle system at all times and is adapted to control at least one component of the second electronically controlled vehicle system only while certain conditions are determined to exist.

In some embodiments, the control unit controls the at least one component of the second electronically controlled vehicle system only while the vehicle is stationary. In some embodiments, the control unit controls the at least one component of the second electronically controlled vehicle system only while the control unit has capacity to control the at least one component of the second electronically controlled vehicle system without interfering with control of the at least one component of the first vehicle system.

In some embodiments, the first electronically controlled vehicle system comprises an electronic brake system. In some embodiments, the control unit controls operation of the at least one component of the first electronically controlled vehicle system and of the at least one component of the second electronically controlled vehicle system in response to sensor input. In some embodiments, the control unit controls operation of the at least one component of the first electronically controlled vehicle system and of the at least one component of the second electronically controlled vehicle system in response to input of a vehicle operator.

In some embodiments, the control unit comprises a main control unit having a memory and the system further comprises at least one auxiliary control unit in communication with the main control unit via a communications link. The main control unit controls operation of the at least one auxiliary control unit, control of the at least one auxiliary control unit being based at least in part upon parameters indicative of a configuration of the at least one auxiliary control unit stored in the memory of the main control unit. The system further comprises a programming unit connectable to the main control unit, the programming unit operable by a user to modify the parameters stored in the memory of the main control unit.

In a further embodiment of the present invention, a control system for a vehicle includes a main control unit having a memory and at least one auxiliary control unit in communication with the main control unit via a communications link. The main control unit controls operation of the at least one auxiliary control unit, control of the at least one auxiliary control unit being based at least in part based upon parameters indicative of a configuration of the at least one auxiliary control unit stored in the memory of the main control unit. A programming unit is connectable to the main control unit, the programming unit operable by a user to modify the parameters stored in the memory of the main control unit.

In some embodiments, the parameters stored in the memory of the main control unit are indicative of vehicle system components which are connected to the at least one auxiliary component. In certain of these embodiments, the at least one auxiliary control unit detects components which are connected to the at least one auxiliary component and displays information to the user via the programming unit indicative of the detected components. In some embodiments, the configuration of the at least one auxiliary control unit of which the parameters are indicative are specified by the user. In some embodiments, the at least one auxiliary control unit comprises a plurality of auxiliary control units.

In some embodiments, the main control unit controls a first electronically controlled vehicle system, and the auxiliary control unit controls a second electronically controlled vehicle system. The main control unit controls operation of at least one component of the first electronically controlled vehicle system while the vehicle is moving and while the vehicle is stationary, and the main control unit controls operation of at least one component of the second electronically controlled vehicle system through the at least one auxiliary control unit only while the vehicle is stationary.

In some embodiments, the main control unit controls a first electronically controlled vehicle system, and the auxiliary control unit controls a second electronically controlled vehicle system. The main control unit is adapted to control at least one component of the first electronically controlled vehicle system at all times and is adapted to control at least one component of the second electronically controlled vehicle system through the at least one auxiliary control unit only while certain conditions are determined to exist.

In another aspect of the present invention, a method for controlling a vehicle includes the steps of providing a first electronically controlled vehicle system, providing a second electronically controlled vehicle system, controlling operation, with a control unit, of at least one component of the first electronically controlled vehicle system while the vehicle is moving and while the vehicle is stationary, and controlling operation, with the same control unit, of at least one component of the second electronically controlled vehicle system only while the vehicle is stationary.

In some embodiments, the first electronically controlled vehicle system comprises an electronic brake system. In some embodiments, the control unit controls operation of the at least one component of the first electronically controlled vehicle system and of the at least one component of the second electronically controlled vehicle system in response to sensor input. In some embodiments, the control unit controls operation of the at least one component of the first electronically controlled vehicle system and of the at least one component of the second electronically controlled vehicle system in response to input of a vehicle operator.

In accordance with another embodiment of the present invention, a method for controlling a vehicle includes the steps of providing a first electronically controlled vehicle system, providing a second electronically controlled vehicle system, controlling, with a control unit, at least one component of the first electronically controlled vehicle system at all times, and controlling, with the same control unit, at least one component of the second electronically controlled vehicle system only while certain conditions are determined to exist.

In some embodiments, the control unit controls the at least one component of the second electronically controlled vehicle system only while the vehicle is stationary. In some embodiments, the control unit controls the at least one component of the second electronically controlled vehicle system only while the control unit has capacity to control the at least one component of the second electronically controlled vehicle system without interfering with control of the at least one component of the first vehicle system.

In some embodiments, the first electronically controlled vehicle system comprises an electronic brake system. In some embodiments, the control unit controls operation of the at least one component of the first electronically controlled vehicle system and of the at least one component of the second electronically controlled vehicle system in response to sensor input. In some embodiments, the control unit controls operation of the at least one component of the first electronically controlled vehicle system and of the at least one component of the second electronically controlled vehicle system in response to input of a vehicle operator.

The invention and its particular features and advantages will become more apparent from the following detailed description considered with reference to the accompanying drawings.

DETAILED DESCRIPTION OF AN EMBODIMENT OF THE INVENTION

Figure 1:
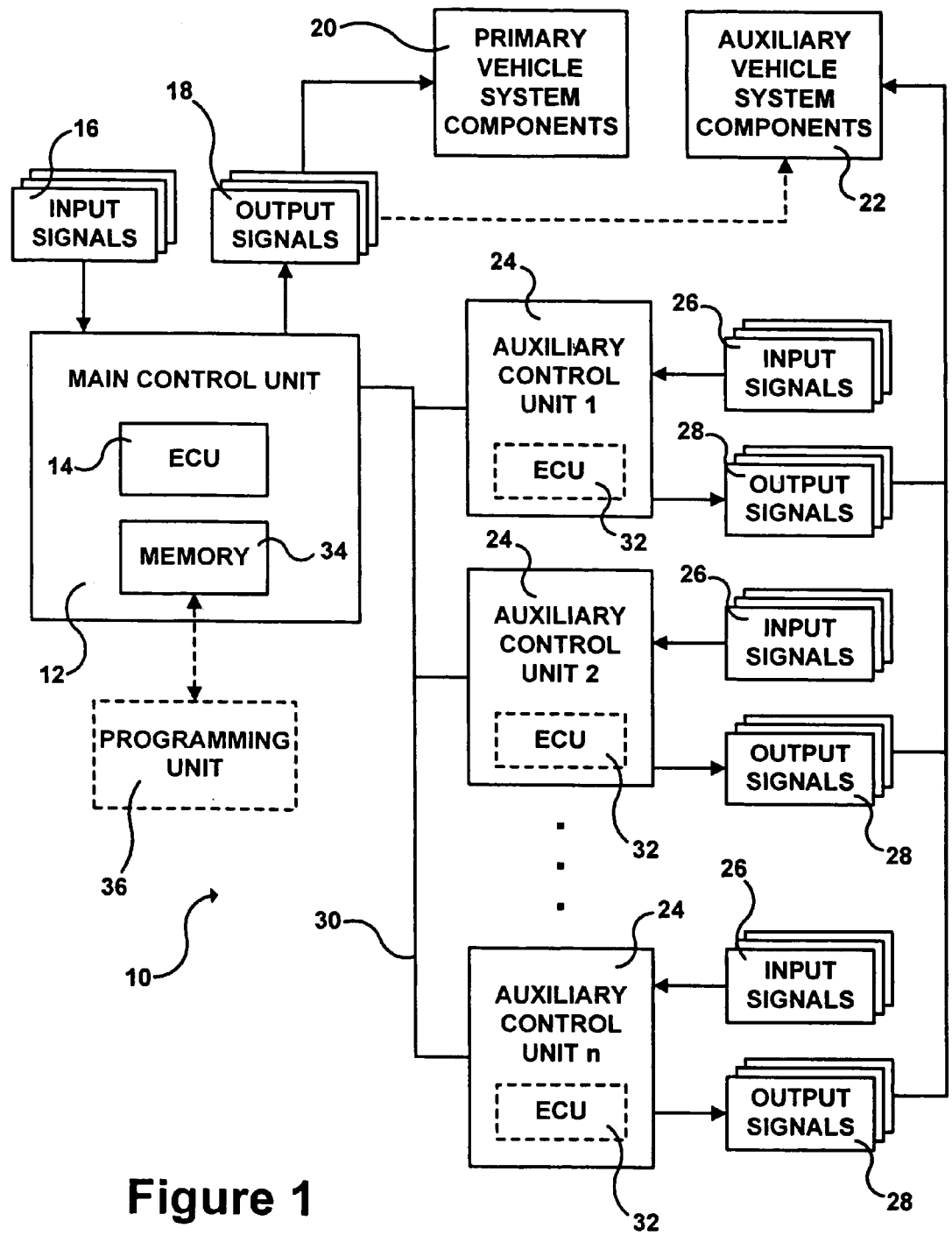
FIG. 1 is a schematic view of a control system which controls a primary electronically controlled vehicle system and which also controls at least one additional auxiliary vehicle system in accordance with one embodiment of the present invention.

Referring first to FIG. 1, a control system 10 which controls a primary vehicle system and which also controls at least one additional auxiliary vehicle system in accordance with one embodiment of the present invention is schematically shown. System 10 includes a main control unit 12 which is associated with the primary vehicle system. What is meant by "primary vehicle system" is that system which the main control unit 12 is primarily intended to control. What is meant by "auxiliary vehicle system" is another vehicle system which the main control unit 12 is not primarily intended to control. Examples of such vehicle systems may include an electronic brake system (EBS), an antilock brake system (ABS), a suspension system, a traction control system, an anti-slip regulation (ASR) system, a steering system, a stability control system, an electronic stability program (ESP), an adaptive cruise control (ACC) system, a diagnostics system, a trailer interface system, a transmission system, an air management control system, a continuous brake retarder system, an engine control system, etc. Thus for example, the main control unit 12 may be an electronic brake system control unit. In this case, the "primary vehicle system" would be the electronic brake system, and the "auxiliary vehicle system" may be any other one of the aforementioned vehicle systems.

Main control unit 12 includes an ECU 14 having a program running thereon (which may be embodied in software, hardware, firmware, etc.) which receives input signals 16 and generates output signals 18 based at least in part upon the input signals 16. At least some of the output signals 18 may include electronic control signals which are supplied to components 20 of the primary vehicle system. Optionally, in some embodiments at least some of the output signals 18 may include electronic control signals which are supplied to components 22 of the auxiliary vehicle system. Input signals 16 may be received from various sensors (such as wheel speed sensors, pressure sensors, force sensors, position sensors, temperature sensors, friction sensors, acceleration sensors, power sensors, acceleration sensors, pitch sensors, vehicle height sensors, vehicle weight sensors) and/or various manual inputs manipulated by the vehicle operator (such as a brake pedal, gas pedal, gear shifter, steering wheel, emergency brake pedal, turn signal indicator, switches for performing various operations, etc.).

System 10 also includes at least one auxiliary control unit 24 which may be associated with one or more auxiliary vehicle systems. In certain embodiments, system 10 includes a plurality of auxiliary control units 24, as shown in FIG. 1. Auxiliary control units 24 receive input signals 26 and transmit output signals 28, which output signals 28 are based at least in part upon the input signals 26. At least some of the output signals 28 may include electronic control signals which are supplied to components 22 of the auxiliary electronically vehicle system. As with input signals 16, input signals 26 may be received from various sensors (such as wheel speed sensors, pressure sensors, force sensors, position sensors, temperature sensors, friction sensors, acceleration sensors, power sensors, acceleration sensors, pitch sensors, vehicle height sensors, vehicle weight sensors) and/or various manual inputs manipulated by the vehicle operator (such as a brake pedal, gas pedal, gear shifter, steering wheel, emergency brake pedal, turn signal indicator, switches for performing various operations, etc.).

System 10 further includes a communications link 30 by which the main control unit 12 and the auxiliary control units 24 are communicable. The communications link 30 may take the form of, for example, a data bus or a control network. It has been found that employing a control area network (CAN) for communications link 30 provides desirable results.

Main control unit 12 is adapted to control, via output signals 18, components 20 of the primary vehicle system at least while the vehicle is moving, and preferably at all times. Main control unit is also adapted to control components 22 of at least one auxiliary vehicle system only while certain conditions are determined to exist. In the case where output signals 18 are supplied directly to components 22 of the auxiliary vehicle system, control of the components 22 of the auxiliary vehicle system may be achieved directly through output signals 18. In the case where output signals 18 are not supplied directly to components 22 of the auxiliary vehicle system, control of the components 22 of the auxiliary vehicle system may be achieved through auxiliary control units 24 and via output signals 28.

In some embodiments, auxiliary control units 24 may be "dumb" in that they do not include the functionality to generate control signals of their own. In these embodiments, the control signals for controlling the components 22 of the auxiliary vehicle system are generated by the main control unit 12. In other embodiments, auxiliary control units 24 may be "smart" in that they include an ECU 32 which is capable of generating control signals to control the components 22 of the auxiliary vehicle system. In these embodiments, the components 22 of the auxiliary vehicle system may be controlled by control signals generated by the auxiliary control units 24 (at times in response to commends from the main control unit 12), or the control signals for controlling components 22 of the auxiliary vehicle system may be generated by both the main control unit 12 and the auxiliary control units 24.

In some embodiments, the main control unit 12 controls components 22 of the auxiliary vehicle system only while the vehicle is stationary. In this case, input signals 16 would preferably include a signal indicative of whether or not the vehicle is moving or is stationary. In some embodiments, the main control unit 12 controls components 22 of the auxiliary vehicle system only while the main control unit 12 has capacity to so control such components 22 without interfering with control of the components 20 of the primary vehicle system. In these cases, the main control unit 12 preferably has a program executing thereon which is adapted to give priority to certain vehicle systems over others. For example, in the case where the primary vehicle system is an electronic braking system, the main control unit 12 may be adapted to control the auxiliary vehicle system only when the brakes are not applied, or only when the ECU 14 has the physical capacity to control both the electronic braking system and the auxiliary braking system. Preferably, the main control unit 12 is user programmable to specify which vehicle systems have priority over other vehicle systems, and/or to specify which conditions must be determined to exist for main control unit 12 to control the components 22 of the auxiliary vehicle system.

As is known by those skilled in the art, in order for input signals 16, 26 to be properly interpreted and for output signals 18, 28 to be properly generated, the ECU 14 must "know" parameters indicative of what devices are supplying or to be supplied with such signals. Typically, the configuration of the main control unit 12 (i.e., what devices are connected to it) will be so "known" and its configuration will be pre-programmed in a memory 34 on main control unit 12. However, because system 10 in intended to be "modular" in that any of a number of auxiliary control units 24 connected to any of a number of other devices may be connected to main control unit 12, main control unit 12 cannot typically be pre-programmed with the configurations of the auxiliary control units 24. As such, some mechanism is necessary for programming main control unit 12 with such information.

In order to provide such functionality, a programming unit 36 is connectable to the main control unit 12, the programming unit 36 operable by a user to modify parameters indicative of the configurations of the auxiliary control units 24 stored in the memory 34 of the main control unit 12. The programming unit 36 may take the form of a typical personal computer (PC) having specially adapted software executing thereon. The programming unit 36 preferably includes an intuitive user interface for allowing a user to easily indicate the configuration of the auxiliary control units 24. For example, the user interface may include graphical representations of various system components and input and output devices which are connectable to the system 10, and allow the user to "drag and drop" such graphical representations to various locations in a graphical representation of the system 10.

In the case where the auxiliary control units 24 are "dumb" (i.e., they do not include ECUs), it may be necessary for the user to manually specify the configuration of the auxiliary control units 24. However, in embodiments where the auxiliary control units are "smart" (i.e., they include ECUs 32), the auxiliary control units 24 may detect devices which are connected thereto and display information to the user via the programming unit 36 indicative of the detected devices. Such may greatly facilitate the user's indicating of the configuration of the auxiliary control units 24.

The present invention, therefore, provides a control system for controlling a primary electronically controlled vehicle system which also controls at least one additional auxiliary vehicle system, which controls the auxiliary vehicle system only at certain times when such does not interfere with control of the primary vehicle system, and which gives precedence to controlling the primary vehicle system over the auxiliary vehicle system.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A control system for a vehicle comprising:
    a first electronically controlled vehicle system;
    a second electronically controlled vehicle system; and
    a control unit which controls operation of at least one component of said first electronically controlled vehicle system while said vehicle is moving and while said vehicle is stationary, and which controls operation of at least one component of said second electronically controlled vehicle system only while said vehicle is stationary.

2. The control system of claim 1 wherein said control unit controls operation of the at least one component of said first electronically controlled vehicle system both while said vehicle is moving and while said vehicle is stationary.

3. The control system of claim 1 wherein said first electronically controlled vehicle system comprises an electronic brake system.

4. The control system of claim 1 wherein said control unit controls operation of the at least one component of said first electronically controlled vehicle system and of the at least one component of said second electronically controlled vehicle system in response to sensor input.

5. The control system of claim 1 wherein said control unit controls operation of the at least one component of said first electronically controlled vehicle system and of the at least one component of said second electronically controlled vehicle system in response to input of a vehicle operator.

6. The control system of claim 1:
    wherein said control unit comprises a main control unit having a memory;
    further comprising at least one auxiliary control unit in communication with said main control unit via a communications link;
    wherein said main control unit controls operation of said at least one auxiliary control unit, control of said at least one auxiliary control unit being based at least in part upon parameters indicative of a configuration of said at least one auxiliary control unit stored in the memory of said main control unit; and
    further comprising a programming unit connectable to said main control unit, said programming unit operable by a user to modify the parameters stored in the memory of said main control unit.

7. A control system for a vehicle comprising:
    a first electronically controlled vehicle system;
    a second electronically controlled vehicle system; and
    a control unit adapted to control at least one component of said first electronically controlled vehicle system at all times and is adapted to control at least one component of said second electronically controlled vehicle system only while certain conditions are determined to exist.

8. The control system of claim 7 wherein said control unit controls the at least one component of said second electronically controlled vehicle system only while said vehicle is stationary.

9. The control system of claim 7 wherein said control unit controls the at least one component of said second electronically controlled vehicle system only while said control unit has capacity to control the at least one component of said second electronically controlled vehicle system without interfering with control of the at least one component of said first vehicle system.

10. The control system of claim 7 wherein said first electronically controlled vehicle system comprises an electronic brake system.

11. The control system of claim 7 wherein said control unit controls operation of the at least one component of said first electronically controlled vehicle system and of the at least one component of said second electronically controlled vehicle system in response to sensor input.

12. The control system of claim 7 wherein said control unit controls operation of the at least one component of said first electronically controlled vehicle system and of the at least one component of said second electronically controlled vehicle system in response to input of a vehicle operator.

13. The control system of claim 7:
wherein said control unit comprises a main control unit having a memory;
further comprising at least one auxiliary control unit in communication with said main control unit via a communications link;
wherein said main control unit controls operation of said at least one auxiliary control unit, control of said at least one auxiliary control unit being based at least in part upon parameters indicative of a configuration of said at least one auxiliary control unit stored in the memory of said main control unit; and
further comprising a programming unit connectable to said main control unit, said programming unit operable by a user to modify the parameters stored in the memory of said main control unit.

14. A control system for a vehicle comprising:
a main control unit having a memory, said main control unit controlling a first electronically controlled vehicle system;
at least one auxiliary control unit in communication with said main control unit via a communications link, said at least one auxiliary control unit controlling a second electronically controlled vehicle system;
wherein said main control unit is adapted to control at least one component of said first electronically controlled vehicle system at all times and is adapted to control at least one component of said second electronically controlled vehicle system through said at least one auxiliary control unit only while certain conditions are determined to exist;
wherein said main control unit controls operation of said at least one auxiliary control unit, control of said at least one auxiliary control unit being based at least in part upon parameters indicative of a configuration of said at least one auxiliary control unit stored in the memory of said main control unit; and
a programming unit connectable to said main control unit, said programming unit operable by a user to modify the parameters stored in the memory of said main control unit.

15. The control system of claim 14 wherein the parameters stored in the memory of said main control unit are indicative of vehicle system components which are connected to said at least one auxiliary component.

16. The control system of claim 15 wherein said at least one auxiliary control unit detects components which are connected to said at least one auxiliary component and displays information to the user via the programming unit indicative of the detected components.

17. The control system of claim 14 wherein the configuration of said at least one auxiliary control unit of which the parameters are indicative are specified by the user.

18. The control system of claim 14 wherein said at least one auxiliary control unit comprises a plurality of auxiliary control units.

19. The control system of claim 14:
wherein said main control unit controls operation of at least one component of the first electronically controlled vehicle system while said vehicle is moving and while said vehicle is stationary, and wherein said main control unit controls operation of at least one component of said second electronically controlled vehicle system through said at least one auxiliary control unit only while said vehicle is stationary.

20. A method for controlling a vehicle comprising the steps of:
providing a first electronically controlled vehicle system;
providing a second electronically controlled vehicle system;
controlling operation, with a control unit, of at least one component of the first electronically controlled vehicle system while the vehicle is moving and while the vehicle is stationary; and
controlling operation, with the same control unit, of at least one component of the second electronically controlled vehicle system only while the vehicle is stationary.

21. The method of claim 20 wherein the first electronically controlled vehicle system comprises an electronic brake system.

22. The method of claim 20 wherein the control unit controls operation of the at least one component of the first electronically controlled vehicle system and of the at least one component of the second electronically controlled vehicle system in response to sensor input.

23. The method of claim 20 wherein the control unit controls operation of the at least one component of the first electronically controlled vehicle system and of the at least one component of the second electronically controlled vehicle system in response to input of a vehicle operator.

24. A method for controlling a vehicle comprising the steps of:
providing a first electronically controlled vehicle system;
providing a second electronically controlled vehicle system;
controlling, with a control unit, at least one component of the first electronically controlled vehicle system at all times; and
controlling, with the same control unit, at least one component of the second electronically controlled vehicle system only while certain conditions are determined to exist.

25. The method of claim 24 wherein the control unit controls the at least one component of the second electronically controlled vehicle system only while the vehicle is stationary.

26. The method of claim 24 wherein the control unit controls the at least one component of the second electronically controlled vehicle system only while the control unit has capacity to control the at least one component of the second electronically controlled vehicle system without interfering with control of the at least one component of the first vehicle system.

27. The method of claim 24 wherein the first electronically controlled vehicle system comprises an electronic brake system.

28. The method of claim 24 wherein the control unit controls operation of the at least one component of the first electronically controlled vehicle system and of the at least one component of the second electronically controlled vehicle system in response to sensor input.

29. The method of claim 24 wherein the control unit controls operation of the at least one component of the first electronically controlled vehicle system and of the at least one component of the second electronically controlled vehicle system in response to input of a vehicle operator.

* * * * *